United States Patent
Nishida et al.

(10) Patent No.: US 10,075,444 B2
(45) Date of Patent: Sep. 11, 2018

(54) INFORMATION PROCESSING SYSTEM, USER TERMINAL, AND DATA PROCESSING DEVICE

(71) Applicants: Takayori Nishida, Kanagawa (JP); Munetake Moroyama, Tokyo (JP)

(72) Inventors: Takayori Nishida, Kanagawa (JP); Munetake Moroyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 224 days.

(21) Appl. No.: 15/002,157

(22) Filed: Jan. 20, 2016

(65) Prior Publication Data
US 2016/0212131 A1 Jul. 21, 2016

(30) Foreign Application Priority Data

Jan. 20, 2015 (JP) .................................. 2015-008515

(51) Int. Cl.
| | |
|---|---|
| G06F 7/04 | (2006.01) |
| H04L 29/06 | (2006.01) |
| H04L 29/08 | (2006.01) |
| G06F 15/16 | (2006.01) |

(52) U.S. Cl.
CPC .............. *H04L 63/10* (2013.01); *H04L 63/08* (2013.01); *H04L 67/1097* (2013.01)

(58) Field of Classification Search
CPC ...... G06F 21/335; G06F 21/41; G06F 21/608; G06F 2221/2141; G06F 2221/2143; G06F 2221/2117; H04L 63/0807; H04L 63/102
USPC .................. 713/186, 182; 726/2, 3, 4, 9
See application file for complete search history.

(56) References Cited

U.S. PATENT DOCUMENTS

| | | | | |
|---|---|---|---|---|
| 2006/0187481 | A1* | 8/2006 | Hayakawa ............ | G06F 3/1204 358/1.14 |
| 2007/0201389 | A1* | 8/2007 | Murayama ............ | H04W 76/11 370/310 |
| 2009/0316206 | A1* | 12/2009 | Anezaki ............. | H04N 1/32619 358/1.15 |
| 2010/0027046 | A1* | 2/2010 | Maeda ............... | G03G 15/5066 358/1.14 |
| 2010/0238482 | A1* | 9/2010 | Tsukada ................ | G06F 3/1205 358/1.14 |
| 2011/0242598 | A1* | 10/2011 | Ohara ................... | G06F 3/1205 358/1.15 |

(Continued)

*Primary Examiner* — Gary S Gracia
(74) *Attorney, Agent, or Firm* — Oblon, McClelland, Maier & Neustadt, L.L.P.

(57) ABSTRACT

An information processing system, comprising a user terminal that sends a process target data designated by a user to a remote storage system via a network, the process target data stored by the storage system in association with authority information that indicates the process target data; an authentication device that receives a registration request from the first circuitry of the user terminal, the registration request including the authority information and user identification information of the user, and stores the user identification information in association with the authority information according to the registration request; and a data processing device that receives an authorization request input by the user, the authorization request including the user identification information, and transmits the authorization request to the authentication device.

18 Claims, 5 Drawing Sheets

(56) References Cited

U.S. PATENT DOCUMENTS

| | | | | |
|---|---|---|---|---|
| 2013/0047247 A1* | 2/2013 | Matsuda | ............... | G06F 21/335 |
| | | | | 726/9 |
| 2013/0094053 A1* | 4/2013 | Shirai | ................... | G06F 3/1222 |
| | | | | 358/1.15 |
| 2013/0329245 A1* | 12/2013 | Nishida | .............. | G06K 15/4095 |
| | | | | 358/1.14 |
| 2014/0068715 A1* | 3/2014 | Kondoh | ................ | G06F 21/608 |
| | | | | 726/3 |
| 2014/0366104 A1* | 12/2014 | Nishida | ................ | G06F 21/608 |
| | | | | 726/5 |

\* cited by examiner

INFORMATION PROCESSING SYSTEM, USER TERMINAL, AND DATA PROCESSING DEVICE

CROSS-REFERENCE TO RELATED APPLICATION

The present application is based upon and claims the benefit of priority of Japanese Patent Application No. 2015-008515, filed on Jan. 20, 2015, the entire contents of which are incorporated herein by reference.

BACKGROUND OF THE INVENTION

Some information processing systems issue a specific identification number per one print job. A user may input the specific number to an image forming apparatus to command the image forming apparatus to issue a print command to print the print job corresponding to the specific number.

For example, an e-mail attached to a print job is sent to a predetermined e-mail address. Then, the specific number is allocated to the print job and the print job and the specific number is stored in association with each other. The specific number is included in a response e-mail to the print-job-attached e-mail and noticed to the user. When the user inputs the specific number to an image forming apparatus, the image forming apparatus acquires the stored print job in association with the input specific number and then the image forming apparatus executes a print process to print the print job.

However, the specific number is unique to each print job. As a result, a plurality of the specific numbers are issued when a plurality of the print jobs are uploaded. As a result, the information processing system requires the user to perform cumbersome operations such as having to input each specific number corresponding to each of the plurality of print jobs.

SUMMARY OF THE INVENTION

In an exemplary implementation, there is provided an information processing system, comprising a user terminal including first circuitry configured to send a process target data designated by a user to a remote storage system via a network, the process target data stored by the storage system in association with authority information that indicates the process target data; an authentication device including second circuitry configured to receive a registration request from the first circuitry of the user terminal, the registration request including the authority information and user identification information of the user, and store the user identification information in association with the authority information according to the registration request; and a data processing device including third circuitry configured to receive an authorization request input by the user, the authorization request including the user identification information, and transmit the authorization request to the authentication device. The second circuitry of the authentication device is further configured to authenticate the user operating the data processing device by transmitting the authority information, corresponding to the user identification information, to the data processing device. The third circuitry of the data processing device is further configured to transmit the authority information to the storage system, receive the process target data associated with the authority information from the storage system, and process the process target data.

In another exemplary implementation, there is provided a user terminal connected with a first apparatus and a second apparatus via a network, the user terminal comprising circuitry configured to send a process target data designated by a user to the first apparatus via the network, the process target data stored by the first apparatus in association with authority information that indicates the process target data, receive the authority information, and send a registration request to the second apparatus, the registration request including the authority information and user identification information of the user.

In another exemplary implementation, there is provided a data processing device connected with a first apparatus and a second apparatus via a network, the data processing apparatus comprising circuitry configured to send user identification information to the second apparatus, receive, from the second apparatus in response to the user identification information, authority information associated with the user identification information, the authority information indicating process target data stored by the first apparatus in association with the authority information, send the authority information to the first apparatus, acquire, from the first apparatus in response to the authority information, the process target data associated with the authority information, and process the process target data.

DESCRIPTION OF THE PREFERRED EMBODIMENTS

Embodiments of the present disclosure are described below with reference to the accompanying drawings.

Figure 1:
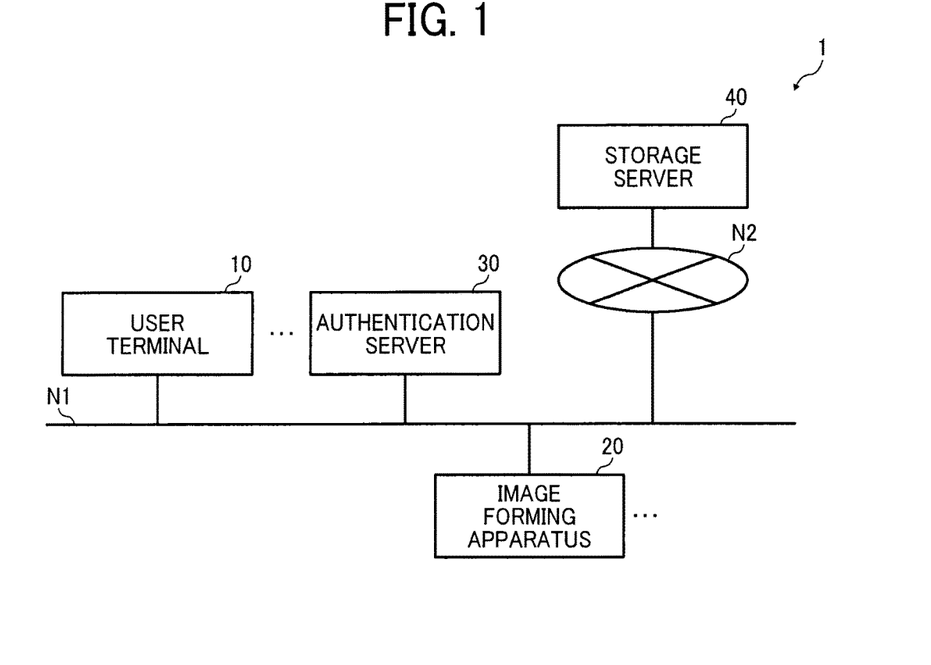
FIG. 1 illustrates an exemplary configuration of an information processing system.

FIG. 1 illustrates an exemplary configuration of an information processing system. As illustrated by FIG. 1, the information processing system 1 include one or more user terminals 10, an authentication server 30 and one or more image forming apparatus 20 connected to each other via a network N1 such as a local area network (LAN). For example, the network N1 may be corporate network secured behind a firewall. Network N1 may be wired or wireless. Also, each user terminal 10, each image forming apparatus 20 and authentication server 30 is connected to storage server 40 via a network N2. Network N2 may comprise an external network or other wide area network, typically referred to as the Internet.

A network as discussed in the present disclosure may comprise any conventional terrestrial or wireless communications network. The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Each user terminal 10 may comprise an information processing apparatus such as a personal computer (PC), a cell phone, a smartphone, a tablet terminal, or a personal digital assistant (PDA). The user terminal 10 is operated by a user that further operates image forming apparatus 20. For example, the user operates the user terminal 10 to designate print target data or to enter a request to print the print target data.

Print target data may have any appropriate data format for printing output. Hereafter, the print target data will be referred to as a "job data".

The job data is sent from user terminal 10 (or uploaded by user terminal 10) to the storage server 40. User terminal 10 does not transmit the job data to an information processing apparatus 20.

The storage server 40 comprises one or more computers that store job data that is sent or uploaded from the user terminal 10. For example, in some embodiments, the storage server 40 may be a computer system that provides services such as an online data storage or a cloud data storage.

The authentication server 30 is a device that manages user identification information such as user names and passwords. For example, the authentication server 30 may authenticate a user that uses the user terminal 10 or the image forming apparatus 20 according to user identification information of the user.

The image forming apparatus 20 is a device that may process and print the job data. For example, the image forming apparatus 20 may be a multifunction peripheral apparatus or a printer. The image forming apparatus 20 acquires, from the storage server 40, the job data that corresponds to the user that operates the image forming apparatus 20 from among a plurality of job data stored in the storage server 40. The image forming apparatus then prints the job data. Additional detail of the processing performed by image forming apparatus 20 will be provided below.

Figure 2:
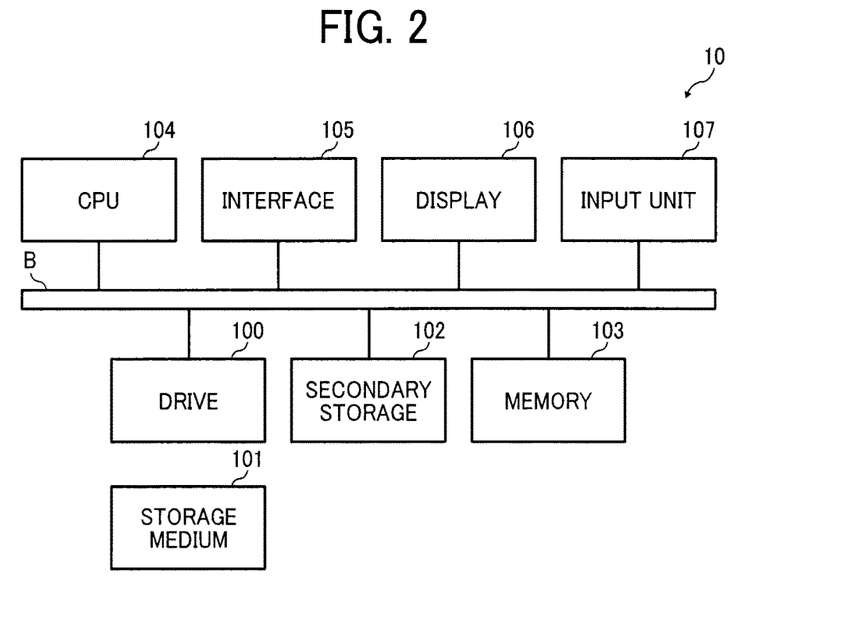
FIG. 2 illustrates an exemplary hardware configuration of a user terminal of the exemplary information processing system.

FIG. 2 illustrates an exemplary hardware configuration of the user terminal 10 of the information processing system of FIG. 1. As illustrated in FIG. 2, the user terminal 10 may include a drive 100, a secondary storage 102, a memory 103, a central processing unit (CPU) 104, an interface 105, a display 106 and/or an input unit 107 that are connected to each other via a bus B.

Programs for implementing various processes at the user terminal 10, by CPU 104, may be provided via a storage medium 101 such as a CD-ROM or other removable recording medium. When the storage medium 101 storing programs is mounted on the drive 100, the programs are read by the drive 100 from the storage medium 101 and are installed in the secondary storage 102. Programs may not necessarily be installed from the storage medium 101. For example, programs may be downloaded via a network from another computer. The secondary storage 102 stores the installed programs and other necessary files and data. The memory 103 temporarily stores programs read from the secondary storage 102 when the programs are executed.

Moreover, user terminal 10 may include circuitry that encompasses any or all of storage medium 101, secondary storage 102, memory 103, CPU 104, interface 105 and bus B. For example, in some embodiments, the circuitry includes CPU 104, which controls the functions of the user terminal 10 according to programs temporarily stored in the memory 103. The circuitry may be processing circuitry.

The interface 105 connects the management server 10 to a network. The display 106 displays Graphical User Interface (GUI) according to the programs and/or according to control of the circuitry. The input unit 107 may be configured a keyboard and a mouse and used for accepting a various inputs of operation instruction.

Figure 3:
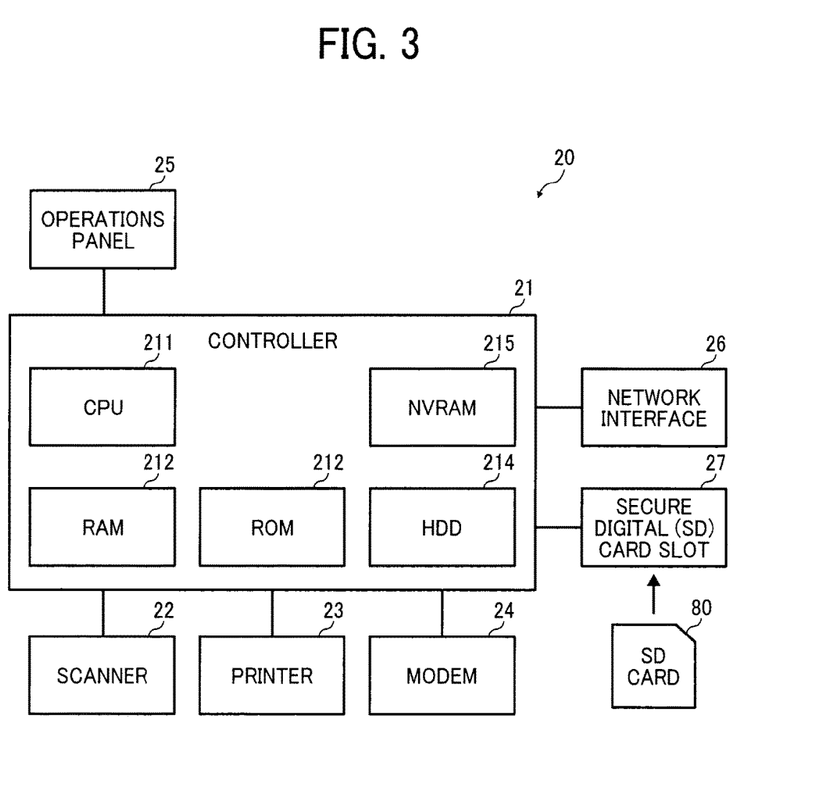
FIG. 3 illustrates an exemplary hardware configuration of an image forming apparatus of the exemplary information processing system.

FIG. 3 illustrates an exemplary hardware configuration of the image forming apparatus 20 of the exemplary information processing system. As illustrated by FIG. 3, the image forming apparatus 20 may include, as hardware components, a controller 21, a scanner 22, a printer 23, a modem 24, an operations panel 25, a network interface 26, and a secure digital (SD) card slot 27.

The controller 21 may include a CPU 211, a random access memory (RAM) 212, a read-only memory (ROM) 213, a hard disk drive (HDD) 214, and a non-volatile RAM (NVRAM) 215. Moreover, controller 21 of image forming apparatus 20 may include circuitry such as CPU 211 for controlling the functionalities and processes of image forming apparatus 20. The ROM 213 stores, for example, programs and data used by the programs. The RAM 212 is used, for example, as a storage area into which programs are loaded and as a work area for the loaded programs. The CPU 211 executes the programs loaded into the RAM 212 to implement various functions. The HDD 214 stores, for example, programs and data used by the programs. The NVRAM 215 stores, for example, various settings.

The scanner 22 is a hardware component (image scanning unit) for scanning a document to obtain image data. The printer 23 is a hardware component (printing unit) for printing print data on a recording medium such as paper. The modem 24 is a hardware component for connecting the image forming apparatus 20 to a telephone line and is used to send and receive image data via facsimile communications. The operations panel 25 is a hardware component including an input unit, such as buttons for receiving user inputs, and a display unit such as a liquid crystal display panel.

For example, a liquid crystal display panel including a touch panel function may be used as the display unit. In this case, the liquid crystal display panel may also function as the input unit.

The network interface 26 is a hardware component for connecting the image forming apparatus 20 to network N1. In some embodiments, however, network interface 26 may be connected to a wired or wireless LAN, the internet and/or directly to another device such as user terminal 10.

The SD card slot 27 reads, for example, programs stored in a secure digital (SD) card 80. With the image forming apparatus 20 configured as described above, in addition to the programs stored in the ROM 213 and the HDD 214, programs stored in the SD card 80 may be loaded into the RAM 212 and executed. Instead of the SD card 80, any other storage medium (e.g., a CD-ROM or a universal serial bus (USB) memory) may be used. That is, a storage medium that may be mounted on the image forming apparatus 20 is not limited to the SD card 80. When a storage medium other than the SD card 80 is used, the SD card slot 27 may be replaced with a hardware component corresponding to the storage medium used.

The scanner 22 and the modem 24 may be omitted from the image forming apparatus 20. That is, the image forming apparatus 20 may be implemented by a printer instead of a multifunction peripheral.

Apparatus 20 may include additional hardware resources such as an input device, an output device, or a network device, depending on the type of the apparatus. Alternatively, the HDD 214 may be provided outside of the apparatus as long as the HDD 214 is accessible. CPU 211 may include a cache memory, and the RAM 212 may function as a physical memory or a primary memory of the apparatus, while the HDD 214 may function as a secondary memory of the apparatus.

Figure 4:
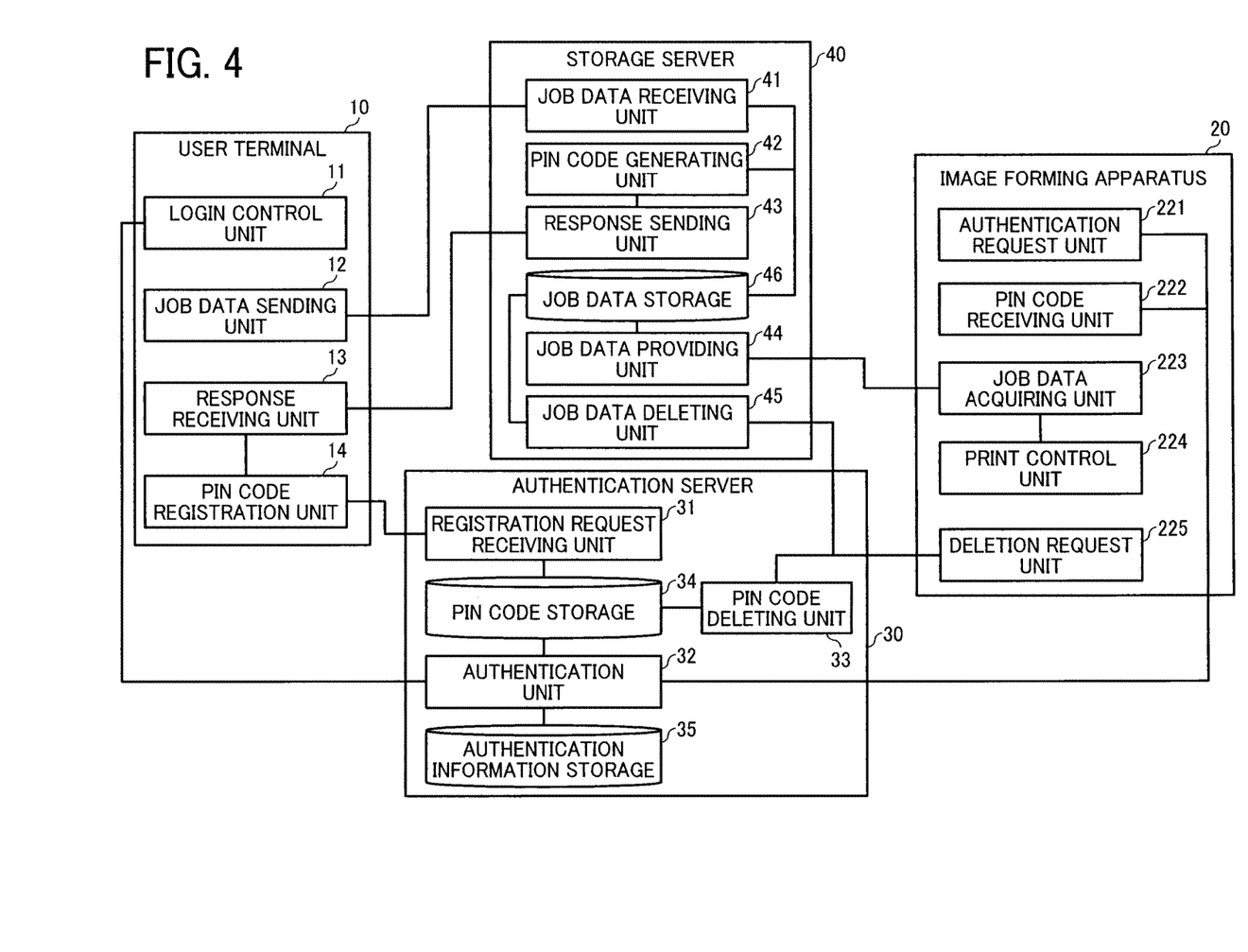
FIG. 4 illustrates an exemplary functional configuration of the information processing system.

FIG. 4 illustrates an exemplary functional configuration of the information processing system 1. As illustrated in FIG. 4, the user terminal 10 may include a login control unit 11, a job data sending unit 12, response receiving unit 13 and a pin code registration unit 14. These functional units may be implemented by the circuitry of user terminal 10, such as by the CPU 104.

The login control unit 11 controls a login process to login a user to user terminal 10. For example, the login control unit 11 receives user identification information such as a user name and password via a login screen on the display 106 and then requests authentication of the user identification information from the authentication server 30. When the authentication of the user information is successful by the authentication server 30, the login control unit 11 permits login of the user and stores the user name input via the login screen as a login user name in the memory 103.

The job data sending unit 12 sends, to the storage server 40, job data which is stored in the secondary storage 102 of the user terminal 10 to storage server 40. The job data may be, for example, document data that is designated by the user to be printed. In an exemplary embodiment, the user designates document data as data to be printed, and then the job data sending unit 12 transmits the job data as process target data to server 40 for later processing by the image forming apparatus 20. In alternative embodiments, the document data is designed to be printed by other means.

The response receiving unit 13 receives, from storage server 40, a response to the process target data transmitted by the job data sending unit 12. The response includes authority information issued by the storage server 40 to identify each process target data and to indicate authority to process the job data. Such processing may be, for example, printing the job data. The authority information may include the identification information such as a "personal identification number (PIN) code". For example, the PIN code may 4-digit number or any digit code including character or symbol. The PIN code may be used to identify each process target data.

The pin code registration unit 14 registers the user name and the PIN code in the authentication server 30 by sending a request to register the user name and the PIN code to the authentication server 30.

The storage server 40 may include a job data receiving unit 41, a pin code generating unit 42, a response sending unit 43, a job data providing unit 44 and a job data deleting unit 45. These functional units may be implemented by circuitry, such as a CPU, that executes one or more programs installed in the storage server 40. The storage server 40 also accesses a job data storage 46. The job data storage 46 may be implemented, for example, by a secondary storage of the storage server 40 or a storage device connected via a network to the storage server 40.

The job data receiving unit 41 receives the process target data sent from the user terminal 10 and stores the received process target data in the job data storage 46. The pin code generating unit 42 generates a PIN code corresponding to the process target data and stores the generated PIN code in association with the process target data in the job data storage 46.

The response sending unit 43 sends a response including the PIN code generated by the pin code generating unit 42 to the user terminal 10 that sent the job data.

The job data providing unit 44 may receive a request, including the PIN code, from an image forming apparatus 20. In response to receiving the PIN code sent by the image forming apparatus 20, job data providing unit 44 sends the process target data associated with the PIN code, received from the image forming apparatus 20, to the image forming apparatus 20. The job data deleting unit 45 deletes the process target data, in which is transmitted to the image forming apparatus 20 has and having been successfully printed by image forming apparatus 20, the job data storage 46.

The authentication server 30 may include a registration request receiving unit 31, an authentication unit 32 and a pin code deleting unit 33. These functional units may be implemented by circuitry, such as a CPU, that executes one or more programs installed in the authentication server 30. The authentication server 30 also accesses a pin code storage 34 and an authentication information storage 35. These storages may be implemented, for example, by a secondary storage of the authentication server 30 or a storage device connected via a network to the authentication server 30.

The registration request receiving unit 31 receives a request to register the user name and the PIN code sent by the user terminal 10. Registration request receiving unit 31 then stores the user name and the PIN code in association with each other in the pin code storage 34.

The authentication unit 32 authenticates the validity of the user identification information sent by the user terminal 10 or the image forming apparatus 20 based on the authentication information stored in the authentication information storage 35. The authentication information storage 35 stores a valid user name and a valid password of each user in association with each other. In an exemplary embodiment, the authentication unit 32 authenticates the validity of the user identification information by comparing the user identification information to the authentication information stored in authentication information storage 35.

The pin code deleting unit 33, in response to receiving a request to delete the PIN code sent by the image forming apparatus 20, deletes the PIN code designated by the request for deletion from the pin code storage 34.

The image forming apparatus 20 may include an authentication request unit 221, a pin code receiving unit 222, a job data acquiring unit 223, a print control unit 224 and a deletion request unit 225. These functional units may be implemented by circuitry, such as CPU 211, that executes one or more programs installed in the image forming apparatus 20.

The authentication request unit 221 sends a request to authenticate a user name and a password to the authentication server 30. In an exemplary embodiment, a user may input the user name and/or the password via operations panel 25. When authentication is successful, the pin code receiving unit 222 receives from the authentication server 30, the PIN code associated with the input user name.

After reception of the PIN code from authentication server 30, job data acquiring unit 223 may transmit the PIN code to job data providing unit 44 of storage server 40. In some embodiments, the job data acquiring unit 223 acquires (or downloads) the job data associated with the PIN code from the storage server 40, with or without transmission of the PIN code to storage server 40. The print control unit 224 controls process of printing the job data acquired by the job data acquiring unit 223. The deletion request unit 225 requests the authentication server 30 to delete the PIN code corresponding to the job data printed normally by the print control unit 224. The deletion request unit 225 also requests the storage server 40 to delete the job data printed normally by the print control unit 224.

Figure 5:
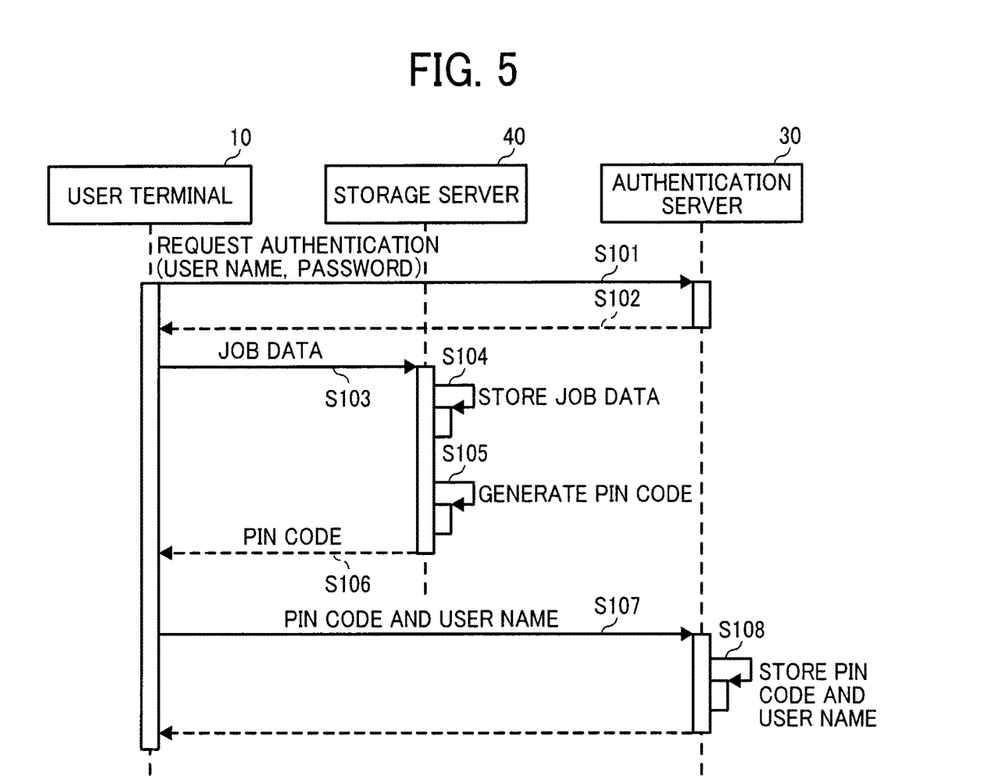
FIG. 5 illustrates exemplary communication between a user terminal, a storage server and an authentication server of an information processing system.

FIG. 5 illustrates exemplary communication between a user terminal, a storage server and an authentication server of the information processing system 1.

When a user inputs a login request on the login screen at the user terminal 10, the login control unit 11 sends an authentication request including user identification information, such as the user name and the password input of the user, with the login request to the authentication server 30 (S101). The authentication unit 32 of the authentication server 30 authenticates the validity of the user name and the password included in the authentication request by checking the user name and the password included in the authentication request against the user name and the password stored in the authentication information storage 35. Subsequently, the authentication unit 32 sends, to the login control unit 11, a response including an authentication result which is a result from the authentication to the authentication request (S102). The login control unit 11 permits login of the user when the authentication result included in the response indicates success. Hereafter, the user name of the user permitted login is referred to as a "login user name".

The user may input an instruction to print document data, such as the document data stored in the secondary storage 102, at the user terminal 10 at any timing. The job data sending unit 12 sends the process target data according to the document data to the storage server 40 in response to the print instruction by the user (S103). The job data receiving unit 41 of the storage server 40 receives the process target data sent by the job data sending unit 12 and stores the received process target data in the job data storage 46 (S104). In some embodiments, the user may designate print attributes of the job data with the print instruction. For example, the print attributes may be sent to the storage server 40 with the job data by the job data sending unit 12 and stored in the job data storage 46. Next, the pin code generating unit 42 generates authority information, the PIN code, that corresponds to the process target data received by the job data receiving unit 41 (S105). The generated PIN code is a different value from other PIN codes stored in the job data storage 46. The pin code generating unit 42 stores the generated unique pin code in the job data storage in association with the process target data stored at the step S104. Then, the response sending unit 43 sends a response including the generated PIN code to the user terminal 10 (S106). The response receiving unit 13 of the user terminal 10 receives the response including the generated PIN code.

Next, the pin code registration unit 14 of the user terminal 10 sends a registration request including the user identification information (the login user name) and the authority information (PIN code) to the authentication server 30 (S107). The registration request receiving unit 31 of the authentication server 30 receives the registration request and stores the user identification information and the authority information included in the registration request in the pin code storage 34 in association with each other (S108).

Figure 6:
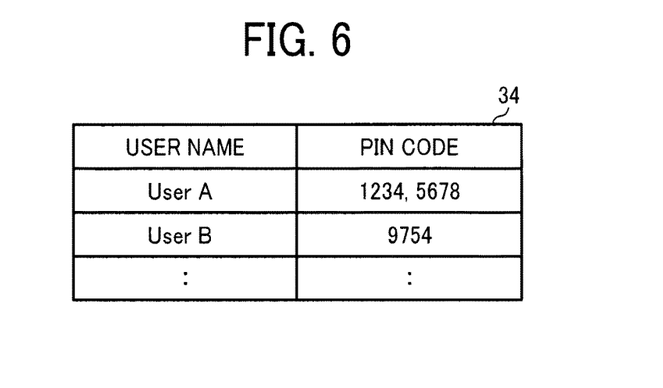
FIG. 6 illustrates a table of an exemplary configuration of a pin code storage.

FIG. 6 illustrates a table of an exemplary configuration of the pin code storage 34. As illustrated by FIG. 6, the pin code storage 34 stores the authority information (PIN code) issued or generated for the process target data of the user in association with the user identification information of the user of the job data. For example, FIG. 6 shows PIN codes "1234" and "5678" corresponding to user name "user A" and PIN code "9754" corresponding to user name "user B." This indicates that the step S103 has been executed two times when the user terminal 10 permits login of the user name "user A" and only one time when the user terminal 10 permits login of the user name "user B".

Returning to step S103, the user may instruct user terminal 10 to send (or print) the process target data via a Web page displayed by accessing predetermined Uniform Resource Locator (URL) in the storage server 40. In this case, the PIN code included in a redirect command of which redirect destination is the authentication server 30 may be sent at the step S106.

Alternatively, the user may instruct to send the job data via a mailer. In this case, an e-mail attached process target data is sent to a predetermined e-mail address of the storage server 40. An e-mail including the authority information and the user identification information included in the response at the step S106 may be sent to the authentication server 30 automatically at the step S107.

Figure 7:
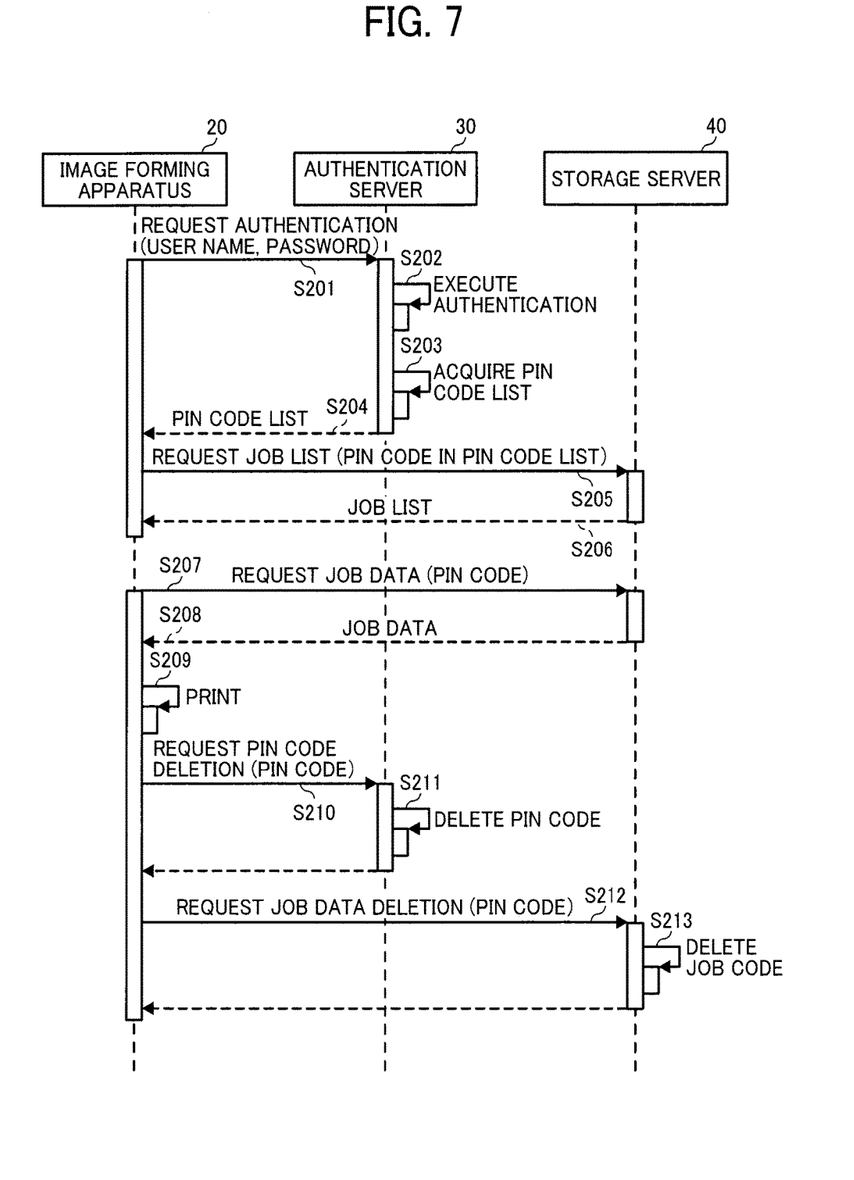
FIG. 7 illustrates a sequence chart of an exemplary process performed by an information processing system.

Next, an exemplary process of job data printing is described below with respect to FIG. 7. FIG. 7 illustrates a sequence chart of an exemplary executed process performed by components of the information processing system 1.

When user identification information such as a user name and/or password are input by the user, for example via the login screen displayed on the operation panels 25 of the image forming apparatus 20, the authentication request unit 221 of the image forming apparatus 20 sends an authentication request including the user identification information to the authentication server 30 (S201). The authentication unit 32 of the authentication server 30 executes authentication process by checking the user identification information included in the authentication request against the valid user name and the valid password stored in the authentication information storage 35 (S202).

When the image forming apparatus 20 receives the authentication result indicating the authentication is failed, the operation panels 25 displays an authentication failure screen, and the image forming apparatus 20 restricts use by the user.

When the authentication is successful, the authentication unit 32 acquires a list of one or more pieces of authority information, such as PIN codes (i.e. a PIN code list), associated with the user identification information included in the authentication request (S203). The list of the one or more pieces of authority information is from the PIN code storage 34. The PIN code list may include some or all of the PIN code(s) associated with the user identification information included in the authentication request. Then, the authentication unit 32 sends the PIN code list to the image forming apparatus 20 (S204). The pin code receiving unit 222 of the image forming apparatus 20 receives the PIN code list sent by the authentication server 30.

After receiving the PIN code list, the job data acquiring unit 223 sends a request, to the job data providing unit 44 of storage server 40, to acquire a list of bibliographic information of the process target data (a job list) that is designated by the one or more PIN codes included in the received PIN code list. That is, the job data acquiring unit 223 sends a request to job data providing unit 44 to acquire a job list that corresponds to the process target data corresponding to the PIN codes included in the PIN code list.

Next, the job data providing unit 44 of the storage server 40 acquires the bibliographic information of the respective job data associated with each PIN codes included in the PIN code list and sends the list of the bibliographic information of the job data (the job list) to the image forming apparatus 20 (S206). For example, the bibliographic information of the process target data includes information relating to a name of process target data and an upload time of the process target data, or may include the print attributes related to the process target data. Furthermore each job data's bibliographic information sent to the image forming apparatus 20 includes the PIN code corresponding to respective job data.

The circuitry of the image forming apparatus 20 controls display, on the operation panel 25, of a job selection screen including the bibliographic information for selecting a particular process target data from among the acquired job list. When the user selects the bibliographic information corresponding to at least one process target data from the selection screen and instructs to print, the job data acquiring unit 223 sends, to the storage server 40, an acquisition request designating the PIN code corresponding to the selected bibliographic information (S207).

In response to the acquisition request, the job data providing unit 44 of the storage server 40 acquires the process target data associated with the PIN code designated by the acquisition request from the job data storage 46. The job data providing unit 44 sends the acquired process target data to the image forming apparatus 20 as a response to the acquisition request (S208).

In some embodiments, step S207 is performed directly after step S204. For example, the process target data of which one or all associated with the PIN code included in the PIN code list sent at the step S204 may be acquired according to an acquisition request by the image forming apparatus 20 at the steps S207 and S208.

When the job data acquiring unit 223 acquires the process target data sent by the storage server 40, the print control unit 224 controls process of printing the acquired process target data (S209). Then, the deletion request unit 225 sends, to the authentication server 30, a PIN code deletion request designating the authority information (PIN code) corresponding to the process target data of which the process of printing has been success (S210). The pin code deletion unit 33 deletes the authority information designated by the PIN code deletion request from the PIN code storage 34 in response to receiving the PIN code deletion request (S211).

Moreover, the deletion request unit 225 sends, to the storage server 40, a process target data deletion request designating the authority information (PIN code) corresponding to the job data of which the process of printing has been success (S212). The job data deletion unit 45 of the storage server 40 deletes the process target data associated with the PIN code designated by the job data deletion request from the job data storage 46 in response to receiving the job data deletion request (S213).

As described above, in this embodiment the respective PIN codes corresponding to each job data uploaded to the storage server 40 are stored in the authentication server 30 in association with the user identification information. When a user inputs their user identification information, e.g. user name and/or password, to the image forming apparatus 20, one or more of the PIN codes associated with the user name is acquired by the image forming apparatus 20 from authentication server 30 and the process target data associated with the acquired PIN code is printed by the image forming apparatus 20.

As a result, the user does not need to input the PIN code by each job data and the user may print the job data of the user associated with the PIN code in the storage server 40 by inputting the user name to the image forming apparatus 20. For the above reasons, according to the present embodiment, it is able to improve the operability of the data stored as the process target.

Additionally, the embodiments of this application decrease a necessity of installing a specific server by a company of the user for storing the job data because of using a server such as an online storage or cloud storage which is managed by outside of the company of the user such as the storage server 40.

These embodiments may be applied to devices other than the image forming apparatus 20. For example, the data processed by a device such as a projector, an electronic blackboard or some other image displaying device may be uploaded to the storage server 40. In this case, when the user logs in to the image displaying device, the data corresponding to the PIN code associated with the user name may be acquired from the storage server 40 for image output.

In the above embodiments, job data is an example of a process target data. The PIN code is an example of authority information. The user name (or the user name and the password) is an example of user identification information and also of authentication information of the user. The print attributes are an example of a process condition data.

The user terminal 10 is an example of an information processing apparatus used by a user when the user sends the process target data. The image forming apparatus 20 is an example of a data processing device. The authentication server 30 is an example of an information processing apparatus for authentication process. The storage server 40 is an example of a storage system consisting of one or more information processing apparatus for storing and managing the process target data.

For the user terminal 10 and the image forming apparatus 20, one of the authentication server 30 and the storage server 40 is an example of a first apparatus, the other is an example of a second apparatus. The job data sending unit 12 is an example of a process target data sending unit. The response receiving unit 13 is an example of an authority information receiving unit. At least one of the pin code registration unit 14 and the registration request receiving unit 31 are an example of a registration unit for registering the authority information.

The authentication request unit 221 is an example of an accepting unit for accepting authentication request by the user. At least one of the authentication request unit 221, the pin code receiving unit 222 and the authentication unit 32 are an example of an authority information acquiring unit for acquiring the authority information or a list of the authority information. The job data acquiring unit 223 is an example of a data list displaying unit and also a process target data acquiring unit. The print control unit 224 is an example of a data processing unit. At least one of the deletion request unit 225 and the pin code deleting unit 33 are an example of an authority information deleting unit. The pin code storage 34 is an example of authority information storage. The job data receiving unit 41 is an example of a process target data receiving unit.

The pin code generating unit 41 is an example of an authority information generation unit for generating the authority information in response to receiving a request of storing (or registering) the process target data. The response sending unit 43 is an example of an authority information sending unit for sending the authority information generated as a response to the request of storing. The job data providing unit 44 is an example of a process target data sending unit. The job data deleting unit 45 is an example of a process target data deleting unit for deleting the stored process target data. The job data storage 46 is an example of a data storage for storing the process target data in association with the authority information.

An information processing system, a user terminal, and a data processing apparatus according to the embodiments of the present disclosure are described above. However, embodiments in accordance with this application may include variations and modifications may be made without departing from the scope of this application. For example, circuitry of an information processing system, a user terminal and a data processing system may execute a method in accordance with the present disclosure.

For example, circuitry of a user terminal, connected with a first apparatus and a second apparatus via a network, the user, may be configured to perform a method comprising sending a process target data designated by a user to the first apparatus via the network, the process target data stored by the first apparatus in association with authority information that indicates the process target data, receiving the authority information, and sending a registration request to the second apparatus, the registration request including the authority information and user identification information of the user. Circuitry of a data processing device, connected with a first apparatus and a second apparatus via a network, may be configured to perform a method comprising sending user identification information to the second apparatus, receiving, from the second apparatus in response to the user identification information, authority information associated with the user identification information, the authority information indicating process target data stored by the first apparatus in association with the authority information, sending the authority information to the first apparatus, acquiring, from the first apparatus in response to the authority information, the process target data associated with the authority information, and processing the process target data.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, and PDAs).

Moreover, embodiments in accordance with the present disclosure may utilize circuitry, dedicated hardware or a mixture of dedicated hardware and and/or circuitry executing software. For example, the present disclosure may be implemented as one or more networked processing apparatuses including circuitry that executes software in accordance with the present disclosure. Processing apparatuses in accordance with the present disclosure may comprise any suitably programmed apparatuses such as a general purpose computer, personal digital assistant, mobile telephone (such as a WAP or 3G-compliant phone) or other digital device including circuitry.

Aspects of the present disclosure may encompass computer software that is executed by circuitry, processing circuitry, or another programmable device. The computer software may be provided to the programmable device using any storage medium for storing processor readable code such as a floppy disk, hard disk, CD-ROM, magnetic tape device, solid state or other memory device.

Features in accordance with the present disclosure may be stored in a non-transitory computer readable medium. For example, a non-transitory computer readable medium may store computer executable instructions that, when executed by circuitry of a user terminal connected with a first apparatus and a second apparatus via a network, the user terminal comprising, cause the circuitry to send a process target data designated by a user to the first apparatus via the network, the process target data stored by the first apparatus in association with authority information that indicates the process target data, receive the authority information, and send a registration request to the second apparatus, the registration request including the authority information and user identification information of the user.

Further, a non-transitory computer readable medium may store computer executable instructions that, when executed by circuitry of a data processing device connected with a first apparatus and a second apparatus via a network, cause the circuitry to send user identification information to the second apparatus, receive, from the second apparatus in response to the user identification information, authority information associated with the user identification information, the authority information indicating process target data stored by the first apparatus in association with the authority information, send the authority information to the first apparatus, acquire, from the first apparatus in response to the authority information, the process target data associated with the authority information, and process the process target data.

Moreover, variations and modifications may be made without departing from the scope of the present disclosure.

What is claimed is:

1. An information processing system, comprising:
a user terminal including first circuitry configured to send a process target data designated by a user to a remote storage system via a network, the process target data stored by the remote storage system in association with authority information that indicates the process target data;
an authentication device including second circuitry configured to
receive a registration request from the first circuitry, the registration request including the authority information and user identification information of the user; and
store the user identification information in association with the authority information according to the registration request; and
a data processing device including third circuitry configured to
receive an authorization request input by the user, the authorization request including the user identification information; and
transmit the authorization request to the authentication device, wherein
the user terminal, the authentication device and the data processing device are remote from each other,
the second circuitry is further configured to authenticate the user operating the data processing device by transmitting the authority information, corresponding to the user identification information, to the data processing device,
the third circuitry is further configured to
transmit the authority information to the remote storage system,
receive the process target data associated with the authority information from the remote storage system, and
process the process target data, and when the first circuitry transmits multiple instances of process target data to the remote storage system,
the second circuitry is configured to
generate multiple instances of authority information, and
provide the multiple instances of authority information to the third circuitry, each instance of authority information associated with each instance of process target data, and
the third circuitry is configured to
transmit the multiple instances of the authority information to the remote storage system,
receive a list of the multiple instances of process target data transmitted to the remote storage system,
control display of the list on a display of the data processing device,
receive a selection, from the user, of a particular process target data from the list, and
acquire the particular process target data selected from among the list.

2. The information processing system as claimed in claim 1, wherein the storage system generates the authority information corresponding to the process target data after the first circuitry sends the process target data to the remote storage system,
the second circuitry authenticates the user operating the user terminal based on the user identification information and
the first circuitry transmits, to the second circuitry in response to receiving the authority information from the remote storage system, the registration request including the authority information in association with the user identification information of the user.

3. The information processing system as claimed in claim 1, wherein the second circuitry deletes the authority information corresponding to the process target data from a storage when the process target data is processed by the third circuitry.

4. The information processing system as claimed in claim 1, wherein the remote storage system does not receive or store the user identification information.

5. The information processing system as claimed in claim 4, wherein each of the authority information corresponding to each of the process target data is individually stored by the remote storage system.

6. The information processing system as claimed in claim wherein
the user identification information includes a user name and a password, and
the second circuitry is configured to authenticate the user identification information by comparing the user name and the password to validated user identification information for the user.

7. The information processing system as claimed in claim 1, wherein the first circuitry is further configured to receive the user identification information from the user.

8. The information processing system as claimed in claim 1, wherein the third circuitry transmits, to the storage server, a request to delete the authority information corresponding to the process target data processed by the third circuitry.

9. A user terminal connected with a first apparatus, a second apparatus and a third apparatus via a network, the user terminal comprising:
circuitry configured to
send a process target data designated by a user to the first apparatus via the network, the process target data stored by the first apparatus in association with authority information that indicates the process target data;
receive the authority information;
send a registration request to the second apparatus, the registration request including the authority information and user identification information of the user; and
send an authorization request to the third apparatus, the authorization request including the user identification information, wherein
the user terminal is remote from the first apparatus, the second apparatus and the third apparatus,
when the circuitry sends multiple instances of process target data to the first apparatus,
the second apparatus is configured to
generate multiple instances of authority information, and
provide the multiple instances of authority information to the third apparatus, each instance of authority information associated with each instance of process target data, and
the third apparatus is configured to
transmit the multiple instances of the authority information to the first apparatus,
receive a list of the multiple instances of process target data transmitted to the first apparatus,
control display of the list on a display of the third apparatus,
receive a selection, from the user, of a particular process target data from the list, and
acquire the particular process target data selected from among the list.

10. The user terminal as claimed in claim 9, wherein the circuitry is further configured to
control login by the user, the user being permitted to log in to the user terminal when the user is authenticated based on authentication information, the authentication information including at least the user identification information of the user and the authentication information further used for logging in to a data processing device which processes the process target data, and
send the authority information and the user identification information of the login user to the second apparatus.

11. The user terminal as claimed in claim 9, wherein
the first apparatus does not receive or store the user identification information, and
the second apparatus does not receive or store the process target data.

12. The user terminal as claimed in claim 11, wherein each of the authority information corresponding to each of the process target data is individually stored by the first apparatus.

13. A data processing device connected with a first apparatus, a second apparatus and a third apparatus via a network, the data processing apparatus comprising:
a display; and
circuitry configured to
send user identification information to the second apparatus;
receive, from the second apparatus in response to the user identification information, authority information associated with the user identification information, the authority information indicating process target data stored by the first apparatus in association with the authority information;
send the authority information to the first apparatus;

acquire, from the first apparatus in response to the authority information, the process target data associated with the authority information; and process the process target data, wherein the data processing device is remote from the first apparatus, the second apparatus and the third apparatus, the third apparatus transmits the process target data to the first apparatus, and when the third apparatus transmits multiple instances of process target data to the first apparatus, the second apparatus is configured to generate multiple instances of authority information, and provide the multiple instances of authority information to the circuitry, each instance of authority information associated with each instance of process target data, and the circuitry is further configured to transmit the multiple instances of the authority information to the first apparatus, receive a list of the multiple instances of process target data transmitted to the first apparatus, control display of the list on the display, receive a selection, from the user, of a particular process target data from the list, and acquire the particular process target data selected from among the list.

14. The data processing device as claimed in claim 13, wherein the circuitry is further configured to send, to the second apparatus, a request to delete the authority information corresponding to the acquired process target data from the second apparatus when the acquired process target data has processed by the data processing unit.

15. The data processing device as claimed in claim 13, wherein the first apparatus does not receive or store the user identification information, and the second apparatus does not receive or store the process target data.

16. The data processing device as claimed in claim 15, wherein each of the authority information corresponding to each of the process target data is individually stored by the first apparatus.

17. The data processing device as claimed in claim 13, wherein the circuitry transmits, to the first apparatus, a request to delete the authority information corresponding to the process target data processed by the circuitry.

18. The data processing device as claimed in claim 13, wherein the user identification information includes a user name and a password, and the second apparatus is configured to authenticate the user identification information by comparing the user name and the password to validated user identification information for the user.

* * * * *